United States Patent
Labrador et al.

(10) Patent No.: US 8,036,112 B2
(45) Date of Patent: Oct. 11, 2011

(54) SYSTEM AND METHOD FOR TRANSMISSION CONTROL PROTOCOL (TCP) TRANSMISSION RATE CONTROL

(75) Inventors: Miguel A. Labrador, Tampa, FL (US); Sivakumar Bakthavachalu, Colorado Springs, CO (US)

(73) Assignee: University of South Florida, Tampa, FL (US)

( * ) Notice: Subject to any disclaimer, the term of this patent is extended or adjusted under 35 U.S.C. 154(b) by 409 days.

(21) Appl. No.: 11/625,591

(22) Filed: Jan. 22, 2007

(65) Prior Publication Data

US 2007/0165531 A1 Jul. 19, 2007

Related U.S. Application Data

(63) Continuation of application No. PCT/US2005/025913, filed on Jul. 21, 2005.

(60) Provisional application No. 60/590,317, filed on Jul. 22, 2004.

(51) Int. Cl.
*G01R 31/08* (2006.01)

(52) U.S. Cl. .................................................. 370/230
(58) Field of Classification Search .......... 370/229–232, 370/235
See application file for complete search history.

(56) References Cited

U.S. PATENT DOCUMENTS

| | | | |
|---|---|---|---|
| 2002/0085587 A1* | 7/2002 | Mascolo | 370/477 |
| 2003/0149785 A1* | 8/2003 | Gerla et al. | 709/232 |

* cited by examiner

*Primary Examiner* — Derrick Ferris
*Assistant Examiner* — Peter Cheng
(74) *Attorney, Agent, or Firm* — Molly L. Sauter; Smith & Hopen, P.A.

(57) ABSTRACT

The present invention provides a smooth friendly TCP based transport layer protocol method and apparatus for data and streaming applications. In accordance with the invention, a low pass filter that uses history information modifies the multiplicative decrease portion of TCP's additive increase multiplicative decrease strategy, thereby creating an additive increase smooth decrease solution. The present invention smoothes the variation of the congestion window in case of drop events and provides smooth transfer rates for streaming applications.

18 Claims, 9 Drawing Sheets

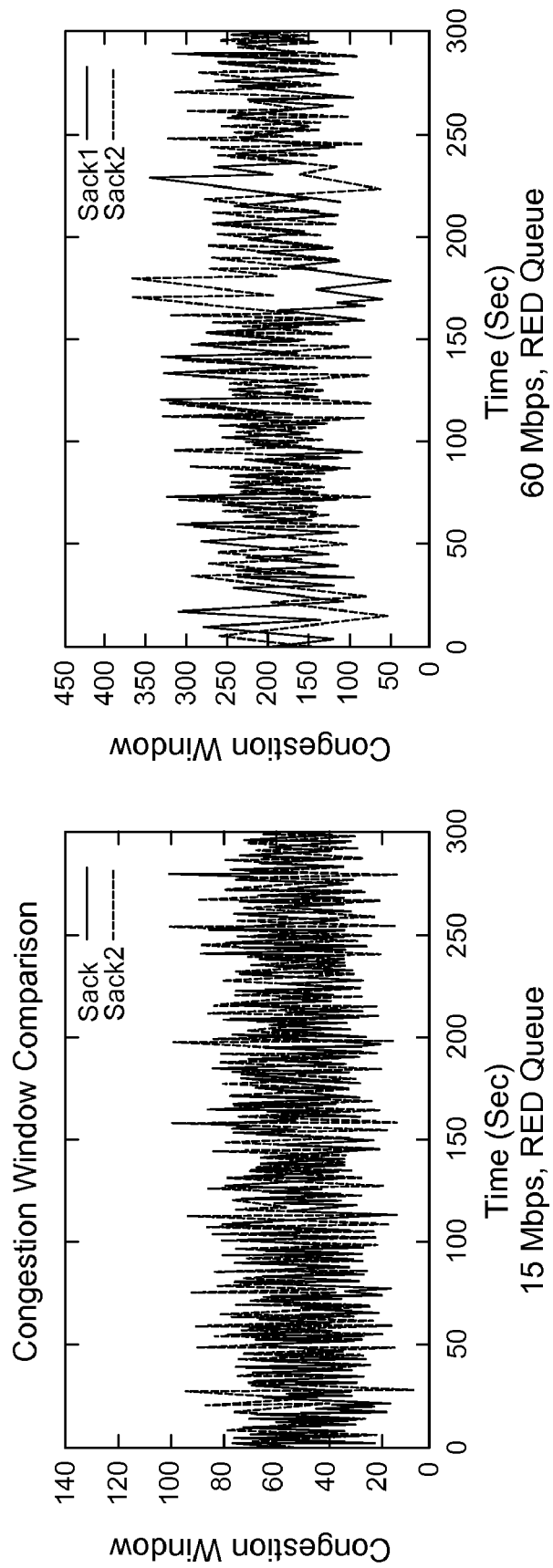
FIG. 4A - TCP SACK

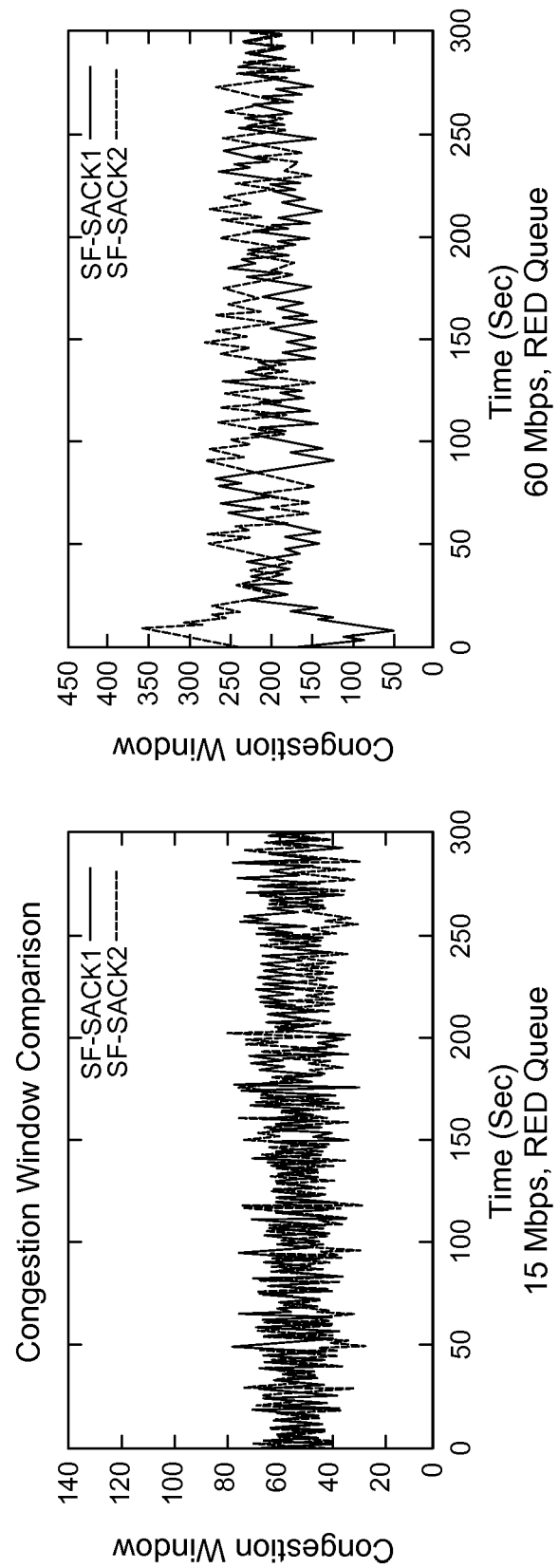
FIG. 4B - SF-SACK

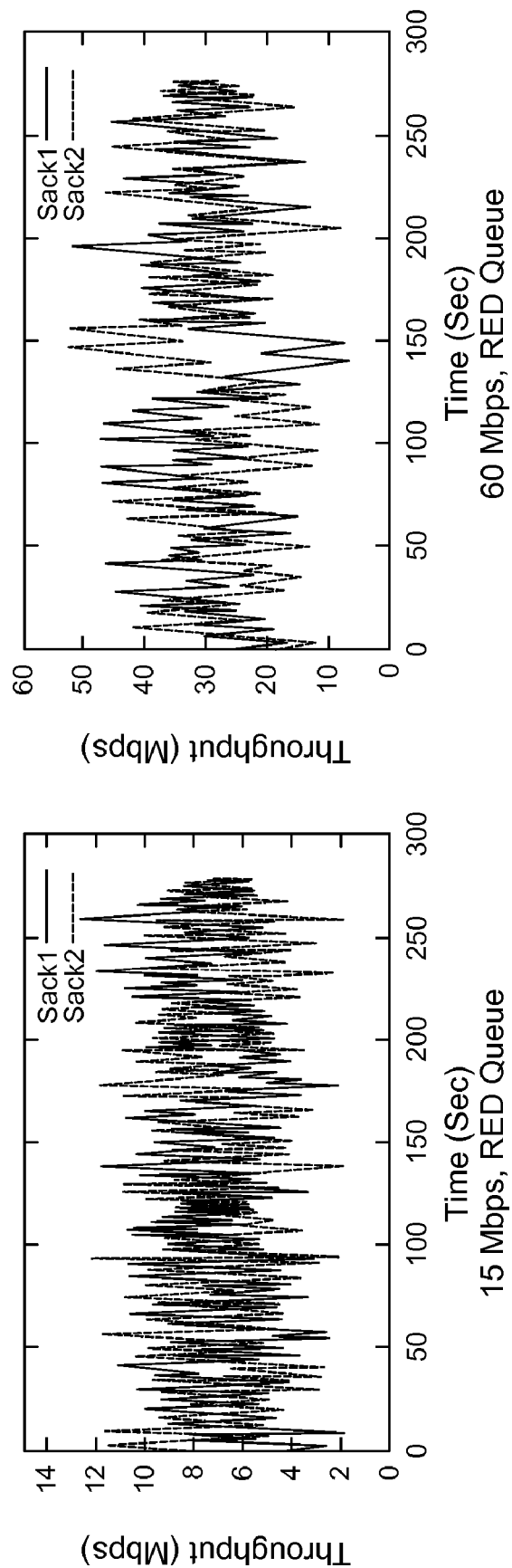
FIG. 5A - TCP SACK

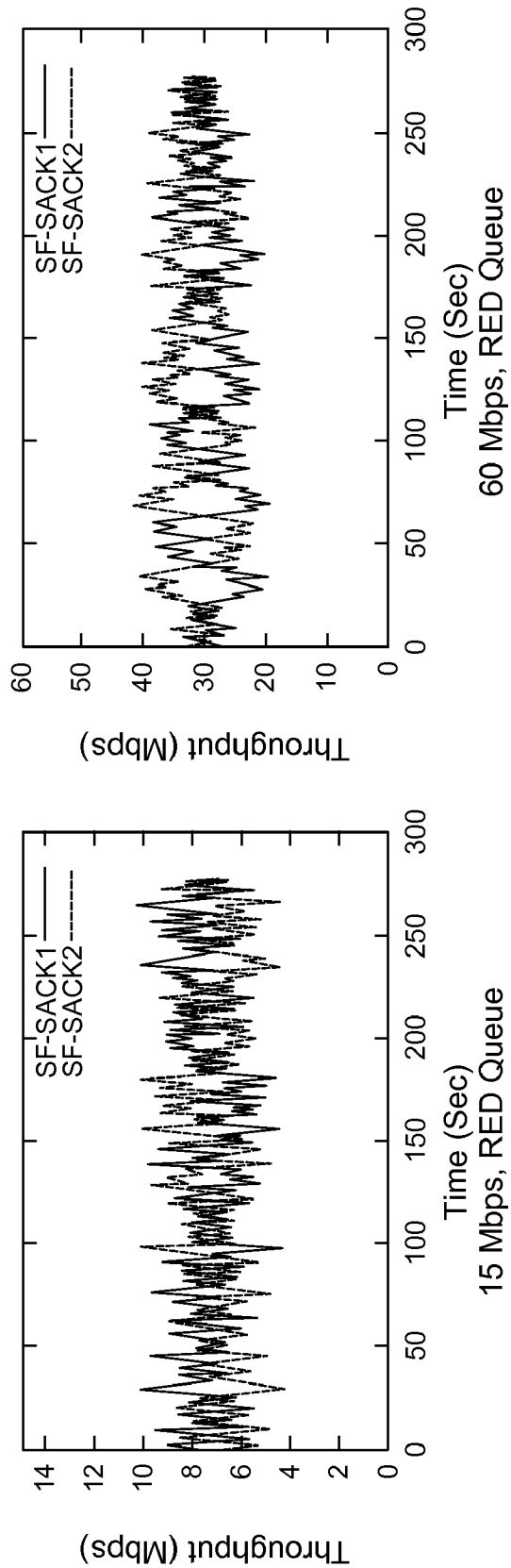
FIG. 5B - SF-SACK

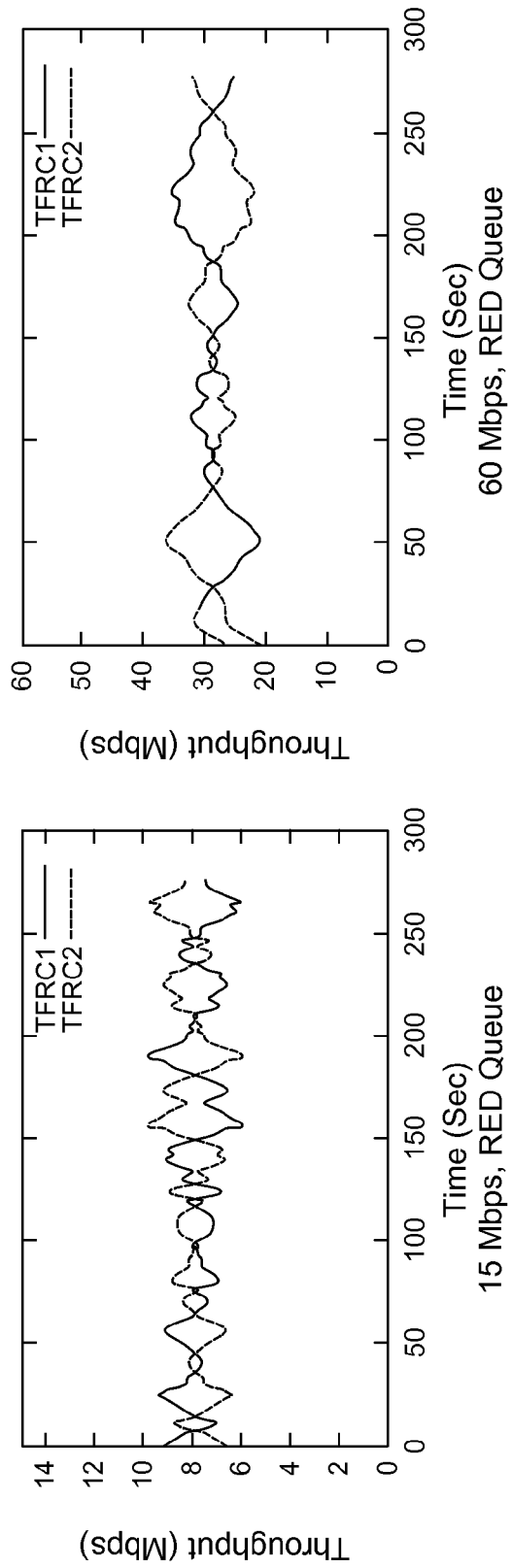
FIG. 5C - TFRC

FIG. 6

TABLE I
MEAN, STANDARD DEVIATION AND COEFFICIENT OF VARIATION OF THE THROUGHPUT
OF TCP TAHOE, RENO, NEW RENO, SACK, SF-SACK AND TFRC.

| TCP Version | 15 Mbps bottleneck link | | | 60 Mbps bottleneck link | | |
|---|---|---|---|---|---|---|
| | Mean (Mbps) (TLP1/TLP2) | Std. Dev. (TLP1/TLP2) | COV (TLP1/TLP2) | Mean (Mbps) (TLP1/TLP2) | Std. Dev. (TLP1/TLP2) | COV (TLP1/TLP2) |
| TCP Tahoe | 7.24/6.49 | 2.57/2.51 | 35.57/38.70 | 29.23/27.59 | 8.49/8.40 | 29.05/30.44 |
| TCP Reno | 7.41/7.33 | 2.14/2.13 | 28.82/29.07 | 30.29/28.35 | 8.07/8.04 | 30.44/28.37 |
| TCP New Reno | 7.29/7.45 | 2.19/2.19 | 30.05/29.42 | 28.68/29.98 | 8.14/8.17 | 28.38/27.25 |
| TCP SACK | 7.54/7.19 | 2.06/2.05 | 27.30/28.58 | 29.98/28.68 | 8.89/8.82 | 29.67/30.73 |
| SF-SACK | 7.65/7.35 | 1.18/1.18 | 15.42/16.05 | 28.52/31.48 | 4.17/4.17 | 14.63/13.25 |
| TFRC | 7.15/7.84 | 0.78/0.78 | 10.93/9.96 | 31.07/28.77 | 3.30/3.35 | 10.62/11.64 |

SYSTEM AND METHOD FOR TRANSMISSION CONTROL PROTOCOL (TCP) TRANSMISSION RATE CONTROL

CROSS REFERENCE TO RELATED APPLICATIONS

This application is a continuation of International Patent Application No. PCT/US2005/025913 filed Jul. 21, 2005 which claims priority to U.S. Provisional Patent Application No. 60/590,317, "SF-SACK: A Smooth Friendly TCP Protocol for Streaming Multimedia Applications", filed Jul. 22, 2004.

BACKGROUND OF INVENTION

The Universal Datagram Protocol (UDP) and the Transmission Control Protocol (TCP) are transport protocols known in the art for communication over the Internet. UDP sends data at a fixed rate with the only constraints being the rate of data generation by the application and bandwidth availability on the network. The characteristics of UDP make it an ideal candidate for use in voice over IP, video applications and other real-time applications. A problem with UDP arises when the number of streaming media applications on the network increases. With UDP, each application tries to capture the amount of bandwidth that satisfies its fixed sending rate requirement. This often leads to problems of unfairness and the danger of congestion collapse of the network. The unfairness problem in UDP arises due to the lack of an end-to-end congestion control.

The TCP protocol is a reliable transport protocol that promises guaranteed delivery. It is connection-oriented, establishing a full duplex virtual connection between two end points. The TCP protocol at the transport layer breaks the application data into chunks of best decided size called segments, along with overhead information such as the source and destination port number, sequence number, etc. Once the segment is sent, a timer is set and waits for the receiver to acknowledge (ACK) the segment. If an ACK is not received before the timer expires, TCP retransmits the segment. TCP also maintains a checksum on its header and data to ensure the packet's integrity while in the network. Packet reordering is also performed if necessary to ensure data reception in correct order by the end application. The chief feature of TCP is its flow and congestion control. Flow control checks for buffer space at the end systems and slows down the data transfer rate if the buffer capacity is reached. Hence, TCP limits the sender to send only as much data as the receiver can handle. Flow control only prevents the sender from overflowing the receiver's buffer, but it does not take into account the buffers of intermediate nodes, i.e., network congestion. To solve the problem of overloading the network nodes between end systems, TCP implements a congestion control mechanism. While flow control is an end system issue, congestion control is a network issue. Congestion control implementations for TCP are known in the art. These congestion control implementations fall into two main categories, window-based and rate-based.

Window-based protocols are known in the art for use with TCP. For each connection, TCP maintains a congestion window (cwnd) state variable, which is the maximum number of packets outstanding in the network. In other words, cwnd refers to the maximum number of packets the sender can send at any time without waiting for an ACK. The congestion control mechanisms embedded in TCP methods and systems known in the art follow the additive increase/multiplicative decrease (AIMD) strategy whereby TCP probes for available bandwidth by increasing its cwnd size linearly, and responds to congestion on the network by decreasing its cwnd size multiplicatively. TCP interprets a timeout or packet loss as a sign of congestion and decreases the cwnd, while successful receipt of ACKs for all packets sent during the last round trip time (RTT) as a sign to increase the cwnd. Apart from congestion control mechanisms, congestion avoidance plays a great role in the real stability of the Internet. Both the mechanisms are basically resource management problems. The key to the congestion avoidance scheme is the algorithm used to increase or decrease the rate, allowing the network to operate in the optimal region of low delay and high throughput. The increase and decrease parameters are designated as $\alpha$ and $\beta$ respectively, such that $0<\alpha$ and $0<\beta<1$ is satisfied. In TCP implementations currently known in the art, the values of these parameters are $\alpha=1$ and $\beta=\frac{1}{2}$, meaning that the cwnd is increased by one every RTT and decreased by $\frac{1}{2}$ its current value after a packet drop is detected.

Mechanisms have been proposed in the art to improve the network throughput, these mechanisms include, slow start, congestion avoidance, fast retransmit and fast recovery. These mechanisms are well known in the art and form the base of TCP Tahoe, Reno, New Reno and SACK. In particular, TCP SACK (Selective Acknowledgement) is a conservative extension of Reno's congestion control, in which it uses the AIMD strategy and minimal changes to other congestion control algorithms. TCP SACK is widely used in the industry, however, the problem with using TCP SACK for streaming applications resides in the multiplicative part of the AIMD strategy. As described, the TCP protocol changes its sending rate using a congestion control mechanism by backing off the sending rate on packet drops responding to congestion on the network. While TCP as served data-oriented applications quite well because these applications can tolerate variable delays and transmission rates, but require a very reliable service. On the other hand, real-time applications like voice and video have employed the UDP protocol because these applications can tolerate some loss but require minimal delay variations and smooth transmission rates, otherwise the user will perceive a degradation in the quality of the transmission in the form of interrupted voice and/or frozen images. Because real-time applications are delay sensitive and cannot tolerate a varying sending rate, TCP is not ideal for streaming applications and the use of TCP on the Internet has been limited to data transmission. Additionally, the reliability of TCP's retransmissions is useless for interactive real-time applications such as Internet Telephony and Voice Conference since retransmitted packets reach their destination too late for use by the system.

Voice over IP and video applications continue to increase the amount of real-time traffic over the Internet. These streaming applications utilize the UDP protocol because TCP has not proved to be suitable for streaming applications due to the use of a congestion control mechanism that can drastically change the connection's transmission rate, affecting the user-perceived quality of the transmission.

The TCP-friendliness problem has also been widely investigated. Solutions can be broadly classified as either end-to-end or router-based depending on where the solution is implemented. The transport layer protocols previously described belong to the end-to-end category. Although each protocol is adequate for the types of applications it serves, they have not been shown to work together. It is well known that during congestions events, when TCP and UDP share the same bottleneck link, UDP is not fair to TCP, obtaining a disproportionate share of the bandwidth. Since the number of streaming applications and multimedia traffic over the internet is growing, this TCP-friendliness problem continues to become more relevant. The need for an end-to-end congestion control for streaming applications has been identified as a solution to the fairness problem and the congestion collapse problem on the internet.

Accordingly, in spite of the deficiencies that are inherent in the use of TCP with streaming applications, the use of these end-to-end flow and congestion control mechanisms for streaming applications has been acknowledged as an important measure to ease or eliminate the unfairness problem that exists when TCP and UDP share the same congested bottleneck link and a means to overcome the congestion collapse problem in the Internet.

Accordingly, what is needed in the art is a system and method that provides better performance than TCP systems currently known in the art for data applications and smooth enough transfer rates for streaming media applications.

However, in view of the prior art considered as a whole at the time the present invention was made, it was not obvious to those of ordinary skill in the pertinent art how the identified need could be fulfilled.

SUMMARY OF INVENTION

The present invention provides a smooth and friendly end-to-end solution based on TCP that provides better performance than TCP for data applications and smooth enough transfer rates for streaming applications.

In accordance with a particular embodiment of the present invention, a method for window-based TCP transmission rate control is provided. The method includes the steps of detecting a packet drop in a network, detecting a current congestion window variable value at the time of the packet drop, estimating a new congestion window variable value using a discrete time low pass filter to filter the current value of the congestion window variable and decreasing the TCP transmission rate by decreasing the congestion window variable value to equal the new congestion window variable value in response to the packet drop in the network.

In an additional embodiment, the method includes the step of determining if the packet drop in the network is a first drop event. If the packet drop is a first drop event, the new congestion window variable value to set to be equal to one half the current congestion window variable value at the time of the packet drop.

In calculating the new congestion window variable value to be used to decrease the transmission rate, the congestion type corresponding to the packet drop in the network must first be determined. The congestion type may be either mild congestion or heavy congestion. A mild congestion event is characterized by the reception of 3 duplicate ACKS (DUPACK). A heavy congestion event is characterized as a TIMEOUT in the network. During a mild congestion, the method further includes the step of setting $cwnd\_sample_{t_k}$ equal to the current cwnd/2. During a heavy congestion, the method further includes the step of setting $cwnd\_sample_{t_k}$ equal to 1.

In calculating the new congestion window variable value using a discrete time low pass filter to filter the current value of the congestion window variable in accordance with an embodiment of the present invention, the following relation is followed:

$$cwnd_{t_k} = \frac{\frac{2\tau}{t_k - t_{k-1}} - 1}{\frac{2\tau}{t_k - t_{k-1}} + 1} cwnd_{t_{k-1}} +$$

-continued
$$\frac{1}{\frac{2\tau}{t_k - t_{k-1}} + 1}(cwnd\_sample_{t_k} + last\_cwnd\_sample_{t_{k-1}})$$

where:
$cwnd_{t_k}$ is the new congestion window variable value at time $t=t_k$;
$cwnd_{t_{k-1}}$ is the congestion window variable value at time $t=t_{k-1}$;
$1/\tau$ is the cut-off frequency of the low pass filter;
$t_k-t_{k-1}$ is the time interval between two consecutive packet drops;
$cwnd\_sample_{t_k}$ is set based on the congestion event type identified; and
$last\_cwnd\_sample_{t_{k-1}}$ is the previous $cwnd\_sample_{t_k}$.

It is known that the low pass filter cut-off frequency is equal to $1/\tau$ and that according to the widely known Nyquist sampling theorem, a signal must be sampled at a frequency of at least twice its maximum frequency component. Accordingly, in a particular embodiment, the method in accordance with the present invention includes the step of updating the current congestion window variable at least every $\tau/2$ seconds. In a particular embodiment, the value of $\tau$ is set so that $\tau/2$ spans at least one round trip time (RTT) of the network connection.

In a specific embodiment of the present invention, the TCP SACK version of TCP is utilized as the underlying TCP version, however this is not meant to be limiting and the method in accordance with the present invention can be practices in any TCP version, including, but not limited to Tahoe, Reno, Vegas and SACK.

In accordance with another aspect of the invention, there is provided a computer readable medium for providing instructions for directing a processor to carry out a method for window-based TCP transmission rate control, the instructions being operable to detect a packet drop in a network, detect a current congestion window variable value at the time of the packet drop, estimate a new congestion window variable value using a discrete time low pass filter to filter the current value of the congestion window variable and decrease the TCP transmission rate by decreasing the congestion window variable value to equal the new congestion window variable value in response to the packet drop in the network.

In accordance with another aspect of the invention, there is provided an apparatus for controlling the rate at which packets are transmitted from a sender in a window-based TCP network. The apparatus comprises means for detecting a packet drop in a network, means for detecting a current congestion window variable value at the time of the packet drop, means for estimating a new congestion window variable value using a discrete time low pass filter to filter the current value of the congestion window variable and means for decreasing the TCP transmission rate by decreasing the congestion window variable value to equal the new congestion window variable value in response to the packet drop in the network.

In accordance with another aspect of the invention, there is provided an apparatus for controlling the rate at which packets are transmitted from a sender in a window-based TCP network. The apparatus includes a detector for detecting a packet drop in a network and for detecting a current congestion window variable value at the time of the packet drop, a congestion window estimator for estimating a new congestion window variable value using a discrete time low pass filter to filter the current value of the congestion window variable, a transmission rate controller for decreasing the TCP transmission rate by decreasing the congestion window variable value to equal the new congestion window variable value in response to the packet drop in the network. The apparatus may further include a scheduler operable to update the current congestion window variable at least every τ/2 seconds, wherein 1/τ is the low pass filter cutoff frequency.

In accordance with the present invention is provided a method and apparatus to improve the end-to-end window-based congestion control algorithm of TCP that smoothes the decrease rate of the congestion window variable value by considering the history in the evolution of the congestion window.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

For a fuller understanding of the invention, reference should be made to the following detailed description, taken in connection with the accompanying drawings, in which:

FIG. 4 is a graphical illustration of the congestion window variation of two flows of the same class competing for 15 Mbps (left) and 60 Mbps (right) bottleneck link. (a) illustrates the results of the systems currently known in the art and (b) illustrates the results in accordance with the present invention.

FIG. 5 is a graphical illustration of the throughput variation of two flows of the same class competing for a 15 Mbps (left) and 60 Mbps (right) bottleneck link. (b) illustrates the results in accordance with the present invention, while (a) and (c) illustrates the results for prior art systems.

FIG. 6 is a table illustrating the mean, standard deviation and coefficient of variation of the throughput of the system and method in accordance with the present invention (SF-SACK) in comparison to other systems currently known in the art.

DETAILED DESCRIPTION OF THE PREFERRED EMBODIMENT

Figure 1:
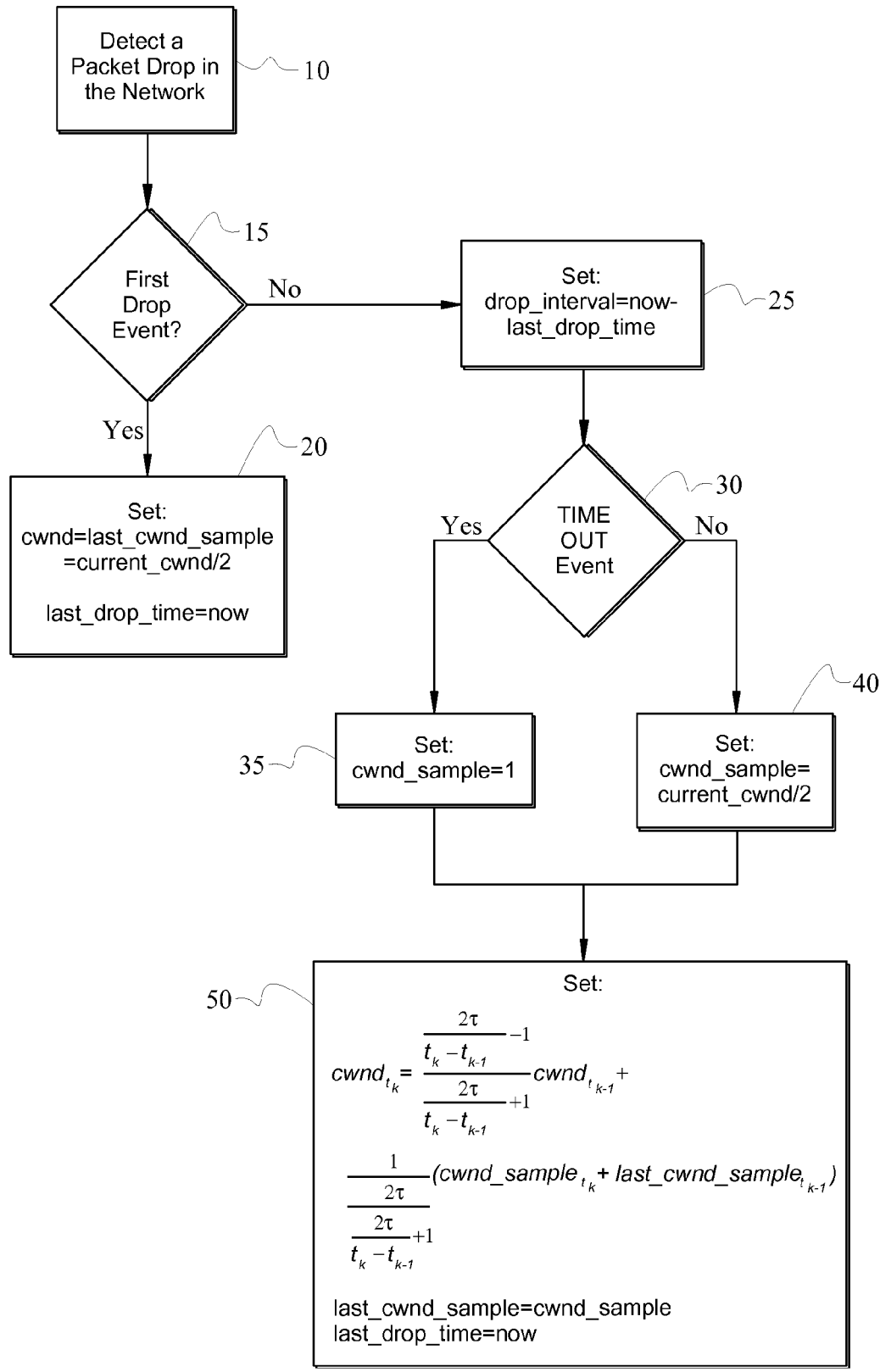
FIG. 1 is a flow diagram of the method in accordance with the present invention.

The method and system in accordance with the present invention provides for a smooth and friendly end-to-end solution based on TCP that provides better performance than TCP solutions currently known in the art for data applications and smooth enough transfer rates for streaming applications. The current TCP AIMD strategy known in the art probes for available bandwidth and increases the transmission rate slowly over time, but decreases the transmission rate drastically in response to congestion on the network. In doing so, TCP AIMD implementations commonly employed in the art exhibit rapidly varying transmission rates, which are highly undesirable for constant bit rate applications such as voice and video. By contrast, the system and method in accordance with the present invention considers the history in the decreasing transmission rate strategy, using a smooth averaging algorithm. The implementation of this solution only requires sender side modifications to TCP, making it easy to implement.

Many TCP versions are known in the art and are considered within the scope of the present invention. In a particular embodiment, TCP SACK has been selected as the underlying TCP version for the present invention. The selection of TCP SACK is not meant to be limiting, but rather TCP SACK has been chosen due to its widespread use and it has been shown to provide better throughput and performance over wired and wireless networks than other TCP versions.

A window-based algorithm of TCP varies the transmission rate by changing the congestion window (cwnd) variable. In accordance with the present invention, the value of cwnd is increased during regular ACK reception, which corresponds to a successful delivery of a packet at the receiver, and decreased during either a dup-ACK or a timeout, corresponding to a packet drop in the network. The present invention substitutes the multiplicative decrease part of TCP systems and methods commonly known in the art with a smooth decrease strategy that considers the history of the cwnd value. To achieve this smooth decrease strategy, a discrete time filter obtained by discretizing a continuous low pass filter using the Tustin Approximation. Therefore, the cwnd at time $t=t_k$ is calculated using the following relationship:

$$cwnd_{t_k} = \frac{\frac{2\tau}{t_k - t_{k-1}} - 1}{\frac{2\tau}{t_k - t_{k-1}} + 1} cwnd_{t_{k-1}} + \frac{1}{\frac{2\tau}{t_k - t_{k-1}} + 1}(cwnd\_sample_{t_k} + last\_cwnd\_sample_{t_{k-1}}) \quad (1)$$

Where $cwnd_{t_k}$ is the filtered value of the congestion window at time $t=t_k$, $1/\tau$ is the cut-off frequency of the filter, and $t_k-t_{k-1}$ is the interval of consecutive packet drop events. The value of the $cwnd\_sample_{t_k}$ during the calculation is set based on the type of congestion event. The $cwnd\_sample_{t_k}$ is set to cwnd/2 during mild congestion (reception of 3 duplicate ACKS), and set to 1 during heavy congestion (TIMEOUT).

The relationship presented above shows that the $cwnd_{t_k}$ depends on the history of the cwnd given by the $cwnd_{t_{k-1}}$ value, the values of $cwnd\_sample_{t_k}$ and $last\_cwnd\_sample_{t_{k-1}}$ given by the value of cwnd at times $t=t_k$ and $t=t_{k-1}$ and the type of congestion event, and the time interval between packet drops. This relationship is referred to in the present invention as smooth, friendly SACK, or SF-SACK.

The method in accordance with an embodiment of the present invention is illustrated with reference to FIG. 1. As shown in FIG. 1, when a drop is detected 10 the method determines if this is a first drop event 15. If it is a first drop event, then cwnd is set to be equal to the last_cwnd_sample$_{t_{k-1}}$=which is set to be equal to the current_cwnd/2, and the last_drop_time is set to the current time interval (now) 20. If this is not the first drop event, then the drop_interval is set to be equal to now minus the last_drop_time 25. Next, a determination is made as to the type of congestion event 30. If the congestion is determined to be a TIMEOUT event, cwnd_sample is set to be equal to one 35. If the congestion event is not a TIMEOUT, cwnd_sample is set to equal to current_cwnd/2 40. Then, using the low pass filter, the congestion window variable value at $t=t_k$ is calculated based on the identified parameters, and last_cwnd_sample=cwnd_sample and last_drop_time is set to the time now 50.

It can be shown that the behavior of the low pass filter fits very well with the requirements of a smooth varying congestion control algorithm. This behavior is illustrated by setting $\delta_k = t_k - t_{k-1}$, and rewriting the above Eqn. 1 as:

$$cwnd_{t_k} = \frac{2\tau - \delta_k}{2\tau + \delta_k} cwnd_{t_{k-1}} + \left(1 - \frac{2\tau - \delta_k}{2\tau + \delta_k}\right) \times \left(\frac{cwnd\_sample_{t_k} + last\_cwnd\_sample_{t_{k-1}}}{2}\right) \quad (2)$$

Further, if $$\alpha = \frac{2\tau - \delta_k}{2\tau + \delta_k},$$

then Eqn. 2 can be expressed in the following form:

$$cwnd_{t_k} = \alpha \times cwnd_{t_{k-1}} + (1-\alpha) \times \left(\frac{cwnd\_sample_{t_k} + last\_cwnd\_sample_{t_{k-1}}}{2}\right) \quad (3)$$

From Eqn. 2 and Eqn. 3, it can be seen that if the interarrival time between packet drops increases, $\delta_k$ increases and $\alpha$ decreases, meaning that the filter will weight the current samples heavier than the history ($cwnd_{t_{k-1}}$). In other words, the method in accordance with the present invention considers the last value of $cwnd_{t_{k-1}}$ (history) as less significant since it represents a rather old value. In contrast, when the interarrival time between packet drop events decreases, the $\alpha$ coefficient increases, giving more value to history than recent samples, smoothing the decrease rate of the congestion window.

An important aspect to consider in the implementation of the filter in accordance with the present invention is the sampling frequency. It is known that the filter cut-off frequency is equal to $1/\tau$ and that according to the widely known Nyquist sampling theorem, a signal must be sampled at a frequency of at least twice its maximum frequency component. Therefore, in order to sample the signal with frequency $1/\tau$, a sampling interval less than or equal to $\tau/2$ is necessary. In other words, the $cwnd_{t_k}$ needs to be updated at least every $\tau/2$ seconds. However, packet drop events depend upon networks conditions, and do not follow any regular interval. As a result, the sampling frequency cannot be guaranteed and the low pass filter in accordance with the present invention might not provide the expected results. To solve this problem, a scheduler is implemented and set to run the algorithm and update the $cwnd_{t_k}$ every $\tau/2$ seconds, regardless of packet drop events. In that case, the algorithm uses the current value of cwnd as $cwnd\_sample_{t_k}$ and the estimation procedure for the congestion window to calculate $cwnd_{t_{k-1}}$. However, since no packets have been dropped, the algorithm continues the additive increase part as if nothing had happened.

Figure 2:
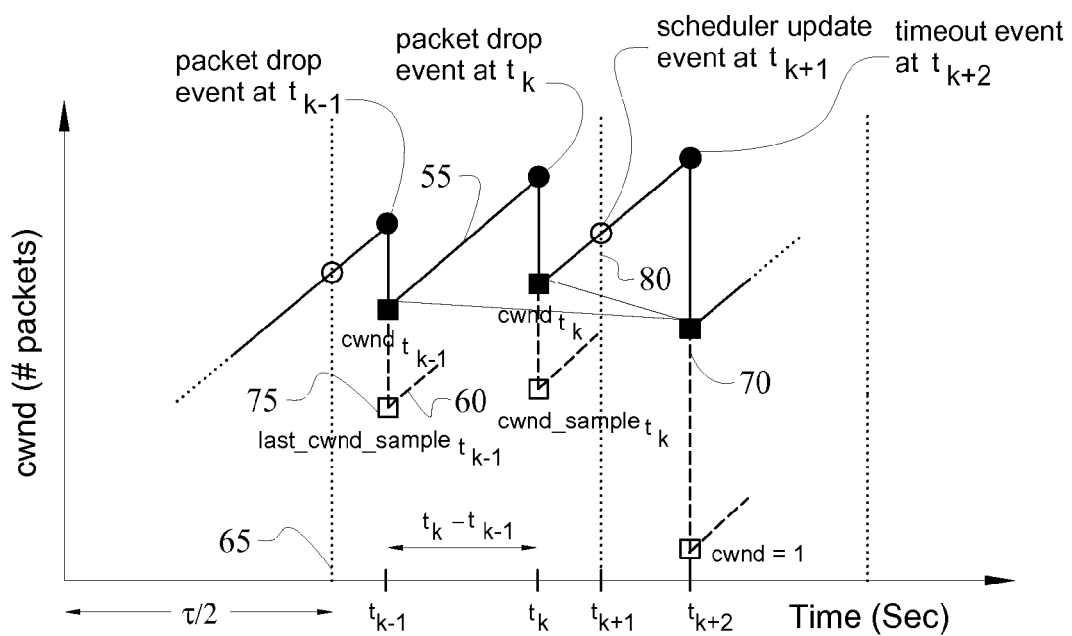
FIG. 2 is a diagrammatic view illustrating the evolution of the congestion window in accordance with the present invention as compared with the evolution of the congestion window of TCP versions known in the art.

FIG. 2 illustrates the evolution of the congestion window of a single smooth friendly SACK (SF-SACK) flow in accordance with the present invention, compared with the evolution of the congestion window of TCP methodologies currently known in the art. With reference to FIG. 2, the bold line 55 shows the cwnd of the present invention while the dashed line 60 shows the cwnd that TCP would have experienced. The dotted vertical lines 65 correspond to the times when the scheduler is run. Hence, the time interval between two dotted lines is $\tau/2$ seconds. In the figure, the black squares 70 are the cwnd values in accordance with the present invention, the white squares 75 are the $cwnd\_sample_{t_k}$ and $last\_cwnd\_sample_{t_{k-1}}$, and the shaded circles 80 represent the value of the cwnd when the scheduler runs, which is used as $cwnd\_sample_{t_k}$.

As can be seen, three cases are possible: 1) packet drop events, either packet drops or timeouts, occur within the scheduler run intervals; 2) loss events occur in different scheduler intervals; or 3) no loss events occur within scheduler's intervals.

The first case occurs when packet drop events occur within a scheduler's interval. In FIG. 2, this case is shown at times $t_{k-1}$ and $t_k$, (middle interval in the figure) and considers the case of mild congestion (3 DUPACKS). In this case, the present invention will use the history information calculated by the filter at time $t_{k-1}$, which is $cwnd_{t_{k-1}}$, the value of $last\_cwnd\_sample_{t_{k-1}}$, which is the value of the cwnd at time $t_{k-1}$ divided by 2, the value of $cwnd\_sample_{t_k}$ at time $t_k$, which is equal to cwnd/2, and the time interval $t_k - t_{k-1}$. The method in accordance with the present invention will result in the new value of the cwnd at time $t_k$, which is given by $cwnd_{t_k}$ and marked in the graph of FIG. 2 with a black square at time $t_k$. Notice that the prior art TCP method would have resulted in a new value of cwnd at time $t_k$ that would have been the value of $cwnd\_sample_{t_k}$ or cwnd/2 (white square at time $t_k$), that does not consider history and reduces the cwnd more drastically than the method in accordance with the present invention.

The second case occurs when packet drop events span different but continuous intervals of the scheduler. This case is shown in the figure at time $t_{k+2}$ in the third interval, where a timeout occurs. In this second case, the present invention takes the values calculated when the scheduler was run for the last time, which happened at time $t_{k+1}$. So, at time $t_{k+2}$ the present invention uses the value of $cwnd_{k+1}$ as the history value, the value of $last\_cwnd\_sample_{t_{k+1}}$, which is equal to the value of cwnd at time $t = t_{k+1}$, and the value of 1 is assigned to $cwnd\_sample_{t_{k+2}}$ because of the timeout event. All these values are used in the method of the present invention to obtain the value of the cwnd at time $t_{k+2}$. The even more drastic reduction of the cwnd experienced by TCP compared with the present invention is evident with reference to FIG. 2.

The third case occurs when there are no packet loss events between scheduler run intervals. In this case, not shown in the figure, the present invention calculates the new congestion window value using the values calculated during the last scheduler run. Since there are no drop events, the time interval $t_k - t_{k-1}$ equals $\tau/2$, and therefore the congestion window value can be calculated from:

$$cwnd_{t_k} = \frac{3}{5} cwnd_{t_{k-1}} + \frac{1}{5} \left(cwnd\_sample_{t_k} + last\_cwnd\_sample_{t_{k-1}}\right)$$

Where the values of last_cwnd_sample and cwnd_sample are given by the value of the cwnd at the scheduler times.

In a packet drop does not occur for a long time, the cwnd continues increasing in an additive manner. However, the values of $cwnd_{t_k}$, $cwnd_{t_{k-1}}$, $cwnd\_sample_{t_k}$ and $last\_cwnd\_sample_{t_{k-1}}$ are updated every $\tau/2$ and used later when a packet drop event occurs. Every $\tau/2$ these new values are updated using the above equation, which assigns a constant weight of 20% to the current and last sample of the cwnd, and 80% to the history. In this manner, when a packet event occurs, the cwnd does not drop drastically.

In order to evaluate the performance of the method of the present invention, the fairness and smoothness of the smooth friendly-SACK in accordance with the present invention is compared with TCP SACK and TFRC in terms of throughput and the variation of the congestion window.

Figure 3:
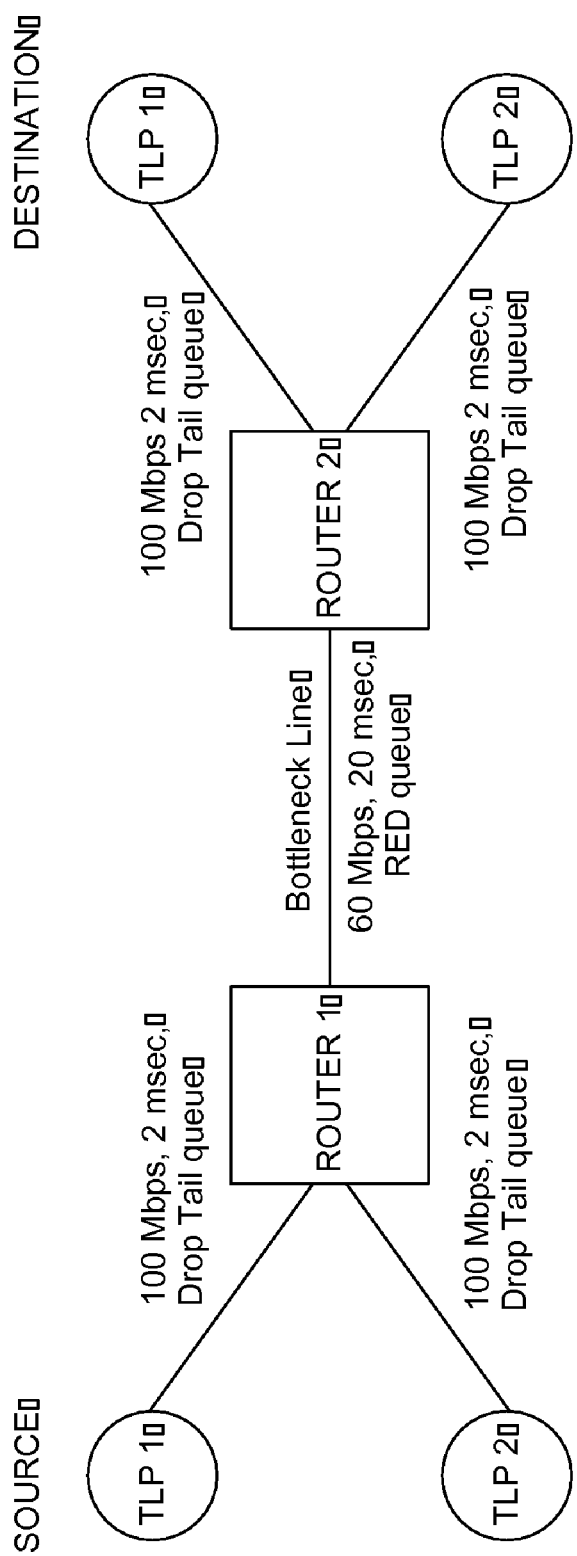
FIG. 3 is a diagrammatic view of the network topology for the simulation setup in accordance with the present invention.

In an exemplary embodiment to compare the present invention against other methods currently known in the art, a network topology consisting of two transport layer protocol (TLP) sources, two transport layer protocol sink nodes, and two routers connected by a bottleneck link were used as shown with reference to FIG. 3. In the simulations, the maximum values of the congestion window for the TLPs were set such that the connections would achieve full link utilization. The bottleneck link two way propagation delay was fixed and set to 20 ms while the bandwidth of the bottleneck link was set to 15 and 60 Mbps. The output buffer size (BS) was set equal to two times the bandwidth delay product (BDP) of the network. The RED mechanism was utilized as the buffer management policy at the bottleneck link. RED's low and high thresholds were set to 0.25* BDP and 1.25* BDP respectively, and its $w_q$ variable was set equal to 0.05. These are commonly used settings for these parameters. The value of τ was set so that τ/2 spans at least one or more RTTs. In a particular embodiment, τ was set to 0.1 seconds or 5 times the RTT.

In order to evaluate the smoothness and fairness of the method in accordance with the present invention, plots are included with the variation of the congestion windows and the throughput of the connections over time, the normalized throughput as the number of connections is increased, and the amount of bandwidth obtained by two different connections (one sending CBR traffic and one sending ftp traffic) when sharing the same bottleneck link of 15 and 60 Mbps.

With reference to FIG. 4, the instantaneous values of the congestion window of the TCP SACK method known in the art and the SF-SACK method in accordance with the present invention are compared when the bandwidth of the bottleneck link is set to 15 and 60 Mbps. From the figure, it can be seen that the present invention substantially reduces the variation of the congestion window, which is at the same time responsible for the smoother throughput that SF-SACK provides compared with TCP SACK. This is shown by comparing FIG. 4 and FIG. 5, where the correlation between the cwnd and the throughput of the connections can be clearly seen. In FIG. 5, the average throughput of the three protocols is also plotted to better illustrate the difference in smoothness. From FIG. 5, it can be observed that although TFRC is still smoother than SF-SACK, SF-SACK is considerably better than TCP SACK.

The table of FIG. 6 shows the mean, standard deviation and coefficient of variation of the throughput achieved by each of the two connections as presented for the different methodologies, including TCP SACK, TFRC, and the present invention methodology denoted as SF-SACK. From the table, the appreciable improvement of the present invention over common TCP versions in terms of smoothness and the little advantage of TFRC over the present invention can be seen.

In addition to the smoothness as evidenced by the table of FIG. 6, another important characteristic of the present invention is the friendliness of the protocol to itself. As can be seen, the SF-SACK in accordance with the present invention behaves as any regular TCP-based protocol where all connections sharing the same bottleneck link obtain a fair share of it. All these results shown that the present invention achieves the objective of providing smooth transfer rates to streaming applications while being friendly to itself.

Additional analysis shows that while SF-SACK in accordance with the present invention is not completely fair to TCP SACK and TFRC, but is considerably fairer than UDP since it implements and end-to-end congestion control mechanism. Accordingly, when the present invention is utilized for both streaming and data-oriented applications, instead of UDP and TCP, the present invention will not only provide reliability but also better performance for data applications. The present invention provides a protocol that is smooth enough for streaming applications. The inclusion of an end-to-end congestion control mechanism as provided by the present invention eliminates or minimizes the congestion collapse problem. The TCP-friendliness problem will no longer exist if the present invention is used for both data and streaming applications since it is fair to itself and the present invention can coexist with TCP and TFRC better than UDP.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method of adjusting the transmission rate for a window-based transport control protocol (TCP) used by a sender to transmit data to a receiver across a network connection of a computer network, the method comprising the steps of:

detecting a packet drop in the network;

detecting a current congestion window variable value at the time of the packet drop, wherein the current congestion window variable value represents the size of the current congestion window, the size of the current congestion window identifying the maximum number of packets the sender can send to the receiver before waiting for an acknowledgement from the receiver;

filtering the current congestion window variable value using a discrete time low pass filter to estimate a new congestion window variable value;

decreasing the TCP transmission rate by decreasing the current congestion window variable value to equal the new congestion window variable value in response to the packet drop in the network; and transmitting the data to the receiver at the decreased TCP transmission rate;

wherein the step of filtering the current congestion window variable value using a discrete time low pass filter to estimate a new congestion window variable value further comprises the steps of:

identifying a congestion type corresponding to the packet drop in the network;

determining a time interval of the packet drop; and filtering the current congestion window variable value using a discrete time low pass filter to estimate a new congestion window variable value according to the following relation:

$$cwnd_{t_k} = \frac{\frac{2\tau}{t_k - t_{k-1}} - 1}{\frac{2\tau}{t_k - t_{k-1}} + 1} cwnd_{t_{k-1}} +$$

$$\frac{1}{\frac{2\tau}{t_k - t_{k-1}} + 1}(\text{cwnd\_sample}_{t_k} + \text{last\_cwnd\_sample}_{t_{k-1}})$$

where:

$\text{cwnd}_{t_k}$ is the new congestion window variable value at time $t=t_k$;

$\text{cwnd}_{t_{k-1}}$ is the congestion window variable value at time $t=t_{k-1}$;

$1/\tau$ is the cut-off frequency of the low pass filter;

$t_k-t_{k-1}$ is the time interval between two consecutive packet drops;

$\text{cwnd\_sample}_{t_k}$ is set based on the congestion event type identified; and $\text{last\_cwnd\_sample}_{t_{k-1}}$ is the previous $\text{cwnd\_sample}_{t_k}$.

2. The method of claim 1, wherein the step of detecting a packet drop in a network further comprises:

determining if the packet drop in the network is a first drop event; and setting the new congestion window variable value equal to one half the current congestion window variable value at the time of the packet drop if the packet drop is determined to be a first drop event.

3. The method of claim 1, wherein the congestion event type in the network is identified as a mild congestion event, the method further comprising the step of setting $\text{cwnd\_sample}_{t_k}$ equal to the current cwnd/2.

4. The method of claim 3, wherein a mild congestion event is identified by three duplicate ACKS.

5. The method of claim 1, wherein the congestion event type in the network is identified as a severe congestion event, the method further comprising the step of setting $\text{cwnd\_sample}_{t_k}$ equal to 1.

6. The method of claim 5, wherein a severe congestion event is identified by a TIMEOUT.

7. The method of claim 1, further comprising the step of updating the current congestion window variable at least every $\tau/2$ seconds, wherein $1/\tau$ is the low pass filter cutoff frequency.

8. The method of claim 7, wherein the value of $\tau$ is set so that $\tau/2$ spans at least one round trip time of the network connection.

9. The method of claim 1, wherein the TCP version is selected from the group consisting of Tahoe, Reno, Vegas, SACK.

10. A non-transitory computer readable medium embodying program instructions for directing a processor to carry out a method for window-based TCP transmission rate control, the program instructions comprising, detecting a packet drop in a network, detecting a current congestion window variable value at the time of the packet drop wherein the current congestion window variable value represents the size of the current congestion window, the size of the current congestion window identifying the maximum number of packets the sender can send before waiting for an acknowledgement from the receiver, filtering the current congestion window variable value using a discrete time low pass filter to estimate a new congestion window variable value and decreasing the TCP transmission rate by decreasing the current congestion window variable value to equal the new congestion window variable value in response to the packet drop in the network;

wherein the step of filtering the current congestion window variable value using a discrete time low pass filter to estimate a new congestion window variable value further comprises the steps of:

identifying a congestion type corresponding to the packet drop in the network;

determining a time interval of the packet drop; and filtering the current congestion window variable value using a discrete time low pass filter to estimate a new congestion window variable value according to the following relation:

$$\text{cwnd}_{t_k} = \frac{\frac{2\tau}{t_k - t_{k-1}} - 1}{\frac{2\tau}{t_k - t_{k-1}} + 1} \text{cwnd}_{t_{k-1}} + $$

$$\frac{1}{\frac{2\tau}{t_k - t_{k-1}} + 1}(\text{cwnd\_sample}_{t_k} + \text{last\_cwnd\_sample}_{t_{k-1}})$$

$\text{cwnd}_{t_k}$ is the new congestion window variable value at time $t=t_k$;

$\text{cwnd}_{t_{k-1}}$ is the congestion window variable value at time $t=t_{k-1}$;

$1/\tau$ is the cut-off frequency of the low pass filter;

$t_k-t_{k-1}$ is the time interval between two consecutive packet drops;

$\text{cwnd\_sample}_{t_k}$ is set based on the congestion event type identified; and $\text{last\_cwnd\_sample}_{t_{k-1}}$ is the previous $\text{cwnd\_sample}_{t_k}$.

11. An apparatus for controlling the rate at which packets are transmitted from a sender in a window-based TCP network, the apparatus comprising:

means for detecting a packet drop in a network;

means for detecting a current congestion window variable value at the time of the packet drop, wherein the current congestion window variable value represents the size of the current congestion window, the size of the current congestion window identifying the maximum number of packets the sender can send before waiting for an acknowledgement from the receiver;

means for filtering the current congestion window variable value using a discrete time low pass filter to estimate a new congestion window variable value; and means for decreasing the TCP transmission rate by decreasing the congestion window variable value to equal the new congestion window variable value in response to the packet drop in the network;

wherein filtering the current congestion window variable value using a discrete time low pass filter to estimate a new congestion window variable value further comprises the steps of:

identifying a congestion type corresponding to the packet drop in the network;

determining a time interval of the packet drop; and filtering the current congestion window variable value using a discrete time low pass filter to estimate a new congestion window variable value according to the following relation:

$$\text{cwnd}_{t_k} = \frac{\frac{2\tau}{t_k - t_{k-1}} - 1}{\frac{2\tau}{t_k - t_{k-1}} + 1} \text{cwnd}_{t_{k-1}} + $$

$$\frac{1}{\frac{2\tau}{t_k-t_{k-1}}+1}(\text{cwnd\_sample}_{t_k}+\text{last\_cwnd\_sample}_{t_{k-1}})$$

where:
cwnd$_{t_k}$ is the new congestion window variable value at time t=t$_k$;
cwnd$_{t_{k-1}}$ is the congestion window variable value at time t=t$_{k-1}$;
1/τ is the cut-off frequency of the low pass filter;
t$_k$-t$_{k-1}$ is the time interval between two consecutive packet drops;
cwnd_sample$_{t_k}$ is set based on the congestion event type identified; and
last_cwnd_sample$_{t_{k-1}}$ is the previous cwnd_sample$_{t_k}$.

12. An apparatus for controlling the rate at which packets are transmitted from a sender in a window-based TCP network, the apparatus comprising:
a detector for detecting a packet drop in a network and for detecting a current congestion window variable value at the time of the packet drop, wherein the current congestion window variable value represents the size of the current congestion window, the size of the current congestion window identifying the maximum number of packets the sender can send before waiting for an acknowledgement from the receiver;
a congestion window estimator for filtering the current congestion windows variable value using a discrete time low pass filter to estimate a new congestion window variable value; and
a transmission rate controller for decreasing the TCP transmission rate by decreasing the current congestion window variable value to equal the new congestion window variable value in response to the packet drop in the network;
wherein the estimator is operable to identify a congestion type corresponding to the packet drop in the network, determine a time interval of the packet drop and estimate the new congestion window variable value using a discrete time low pass filter to filter the current value of the congestion window variable according to the following relation:

$$cwnd_{t_k} = \frac{\frac{2\tau}{t_k-t_{k-1}}-1}{\frac{2\tau}{t_k-t_{k-1}}+1}cwnd_{t_{k-1}}+$$

$$\frac{1}{\frac{2\tau}{t_k-t_{k-1}}+1}(\text{cwnd\_sample}_{t_k}+\text{last\_cwnd\_sample}_{t_{k-1}})$$

where:
cwnd$_{t_k}$ is the new congestion window variable value at time t=t$_k$;
cwnd$_{t_{k-1}}$ is the congestion window variable value at time t=t$_{k-1}$;
1/τ is the cut-off frequency of the low pass filter;
t$_k$-t$_{k-1}$ is the time interval between two consecutive packet drops;
cwnd_sample$_{t_k}$ is set based on the congestion event type identified; and
last_cwnd_sample$_{t_{k-1}}$ is the previous cwnd_sample$_{t_k}$.

13. The apparatus of claim 12, wherein the detector is operable to determine if the packet drop in the network is a first drop event and to set the new congestion window variable value equal to one half the current congestion window variable value at the time of the packet drop if the packet drop is determined to be a first drop event.

14. The apparatus of claim 13, wherein the congestion event type in the network is identified as a mild congestion event, the apparatus being operable to set cwnd_sample$_{t_k}$ equal to the current cwnd/2.

15. The apparatus of claim 14, wherein a mild congestion event is identified by three duplicate ACKS.

16. The apparatus of claim 13, wherein the congestion event type in the network is identified as a severe congestion event, the apparatus being operable to set cwnd_sample$_{t_k}$ equal to 1.

17. The apparatus of claim 16, wherein a severe congestion event is identified by a TIMEOUT.

18. The apparatus of claim 12, further comprising a scheduler operable to update the current congestion window variable at least every τ/2 seconds, wherein 1/τ is the low pass filter cutoff frequency.

* * * * *